United States Patent
Appalla et al.

(10) Patent No.: US 8,804,722 B2
(45) Date of Patent: Aug. 12, 2014

(54) METHOD AND APPARATUS FOR ROUTING MULTICAST DATA ACROSS MULTIPLE MULTICAST ROUTING DOMAINS CONNECTED BY A SHORTEST PATH BRIDGING (SPB) NETWORK

(75) Inventors: Rama Suryanarayana Appalla, Nashua, NH (US); Roger Lapuh, Uesslingen (CH); Srikanth Keesara, Tewksbury, MA (US)

(73) Assignee: Avaya, Inc., Basking Ridge, NJ (US)

( * ) Notice: Subject to any disclaimer, the term of this patent is extended or adjusted under 35 U.S.C. 154(b) by 138 days.

(21) Appl. No.: 13/242,686

(22) Filed: Sep. 23, 2011

(65) Prior Publication Data

US 2013/0077627 A1  Mar. 28, 2013

(51) Int. Cl.
*H04L 12/28* (2006.01)

(52) U.S. Cl.
USPC .......................................................... 370/390

(58) Field of Classification Search
None
See application file for complete search history.

(56) References Cited

U.S. PATENT DOCUMENTS

| | | | | |
|---|---|---|---|---|
| 2010/0189106 A1* | 7/2010 | Azimi et al. | ............... | 370/390 |
| 2010/0284309 A1* | 11/2010 | Allan et al. | ............... | 370/256 |
| 2012/0201244 A1* | 8/2012 | Ou et al. | ............... | 370/390 |
| 2012/0281524 A1* | 11/2012 | Farkas | ............... | 370/221 |

* cited by examiner

*Primary Examiner* — Chi Pham
*Assistant Examiner* — Raul Rivas
(74) *Attorney, Agent, or Firm* — Anderson Gorecki & Rouille LLP

(57) ABSTRACT

A method and apparatus for routing multicast data across multiple multicast routing domains connected by a shortest path bridging (SPB) network is presented. A Shortest Path Bridging (SPB) edge router of an SPB network connected to a PIM network is configured as a Rendezvous Point (RP). A message is received at the RP, and in response, the RP forms a first data structure including multicast sender information. The RP floods the SPB network with a second message containing the first data structure, allocates an Identifier to the multicast stream, and sends a second data structure with sender information. An edge router with multicast receive interest responds with the second data structure with multicast receive interest information. As a result, a receiver in a second network has knowledge of devices in a first network such that multicast traffic is able to be routed between different networks connected to the SPB network.

18 Claims, 5 Drawing Sheets

METHOD AND APPARATUS FOR ROUTING MULTICAST DATA ACROSS MULTIPLE MULTICAST ROUTING DOMAINS CONNECTED BY A SHORTEST PATH BRIDGING (SPB) NETWORK

BACKGROUND

In computer networking, the term "multicast" refers to the delivery of a message or information to a group of destination computers simultaneously in a single transmission from the source creating copies automatically in other network elements, such as routers, only when the topology of the network requires it. Multicast is most commonly implemented in PIM multicast, which is often employed in Internet Protocol (IP) applications of streaming media and Internet television. In PIM multicast the implementation of the multicast concept occurs at the PIM routing level, where routers create optimal distribution paths for datagrams sent to a multicast destination address. At the Data Link Layer, multicast describes one-to-many distribution such as Ethernet multicast addressing, Asynchronous Transfer Mode (ATM) point-to-multipoint virtual circuits (P2MP) or Infiniband multicast.

Shortest Path Bridging (SPB) is a transport network protocol that provides logical Ethernet networks on native Ethernet infrastructure using a link state protocol to advertise both topology and logical network membership. Packets are encapsulated at the edge of an SPB network either in mac-in-mac 802.1ah or tagged 802.1Q/802.1ad frames and transported only to other members of the logical network. Unicast and multicast are supported and all routing is on symmetric shortest paths. Many equal cost shortest paths are supported.

Intermediate System To Intermediate System (IS-IS) is a routing protocol designed to move information efficiently within a computer network, a group of physically connected computers or similar devices. ISIS accomplishes this by determining the best route for datagrams through a packet-switched network. The protocol was defined in ISO/IEC 10589:2002 as an international standard within the Open Systems Interconnection (OSI) reference design. Though originally an ISO standard, the IETF republished the protocol as an Internet Standard in RFC 1142. IS-IS has been called the de facto standard for large service provider network backbones.

SUMMARY

SPB uses ISIS as the control protocol to transfer routing information between devices in an SPB Network acting as a transport network between access networks which may be running different protocols. The presently described method provides support for PIM multicast traffic over an SPB network. When SPB connects multiple multicast routing domains several challenges must be addressed. Among these challenges are that each access domain may run a protocol that may not be supported in the other domain, that the network needs to scale to a large number of access domains, and that the network should support organic growth by adding the new access networks without having to migrate existing access networks.

One of the most widely used protocols is Protocol Independent Multicast—Sparse Mode (PIM-SM) which can use the underlying unicast routing information base or a separate multicast-capable routing information base. PIM-SM is a protocol for efficiently routing Internet Protocol (IP) packets to multicast groups that may span wide-area and inter-domain internets. The protocol is named protocol-independent because it is not dependent on any particular unicast routing protocol for topology discovery, and sparse-mode because it is suitable for groups where a very low percentage of the nodes (and their routers) will subscribe to the multicast session. Unlike earlier dense-mode multicast routing protocols such as DVMRP and dense multicast routing which flooded packets across the network and then pruned off branches where there were no receivers, PIM-SM explicitly constructs a tree from each sender to the receivers in the multicast group.

PIM-SM builds unidirectional shared tree rooted at a Rendezvous Point (RP) per group and optionally creates shortest-path trees per source. PIM-SM works in traditional PIM networks. PIM-SM traditionally is not defined or extended over SPB networks as conventional SPB networks have no knowledge of rendezvous points or rooted multicast trees.

Embodiments of the invention significantly overcome such deficiencies and provide mechanisms and techniques that connect multiple independent PIM-SM domains connected through an SPB cloud and define interactions between PIM-SM and SPB to route multicast traffic between PIM-SM domains.

In a particular embodiment of a method for routing multicast data across multiple multicast routing domains connected by a shortest path bridging network, the method includes configuring each of a plurality of Shortest Path Bridging (SPB) edge routers of an SPB network connected to a PIM based access network as a Rendezvous Point (RP). The method also includes receiving at a first one of the plurality of RPs a first message (e.g., a PIM Register Message), and in response to the receiving a first message, the first one of the plurality of RPs forming a first data structure, the first data structure including multicast sender information. The method further includes flooding, by the first one of the plurality of RPs, the SPB network with a second message containing the first data structure and allocating, by the first one of the plurality of RPs, an identifier (ISID) to the multicast stream and sending a second data structure with sender information. The SPB network uses the second data structure to construct (BVLAN, BMAC) based multicast state which is required to forward multicast traffic in the SPB network. The method additionally includes, for an edge router with multicast receive interest, responding with the second data structure with multicast receive interest information and wherein a receiver in a second network external to the SPB network has knowledge of devices in a first network external to the SPB network such that multicast traffic is able to be routed between different networks connected to the SPB network. There are two particular cases by which the BEB with receive interest learns about the receive interest. It could be either as a result of PIM message or as a result of an IGMP message.

Other embodiments include a computer readable medium having computer readable code thereon for routing multicast data across multiple multicast routing domains connected by a shortest path bridging network. The computer readable medium includes instructions for routing multicast data across multiple multicast routing domains connected by a shortest path bridging network. The computer readable medium includes instructions for configuring each of a plurality of Shortest Path Bridging (SPB) edge routers of an SPB network connected to a PIM based access network as a Rendezvous Point (RP). The computer readable medium also includes instructions for receiving at a first one of the plurality of RPs a first message (e.g., a PIM Register Message), and in response to the receiving a first message, the first one of the plurality of RPs forming a first data structure, the first data structure including multicast sender information. The computer readable medium further includes instructions for flooding, by the first one of the plurality of RPs, the SPB network with a second message containing the first data structure and allocating, by the first one of the plurality of RPs, an identifier (ISID) to the multicast stream and sending a second data structure with sender information. The SPB network uses the second data structure to construct (BVLAN, BMAC) based multicast state which is required to forward multicast traffic in the SPB network. The computer readable medium additionally includes, for an edge router with multicast receive interest, instructions for responding with the second data structure with multicast receive interest information and wherein a receiver in a second network external to the SPB network has knowledge of devices in a first network external to the SPB network such that multicast traffic is able to be routed between different networks connected to the SPB network. There are two particular cases by which the BEB with receive interest learns about the receive interest. It could be either as a result of PIM message or as a result of an IGMP message.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides for routing multicast data across multiple multicast routing domains connected by a shortest path bridging network as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing routing multicast data across multiple multicast routing domains connected by a shortest path bridging network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
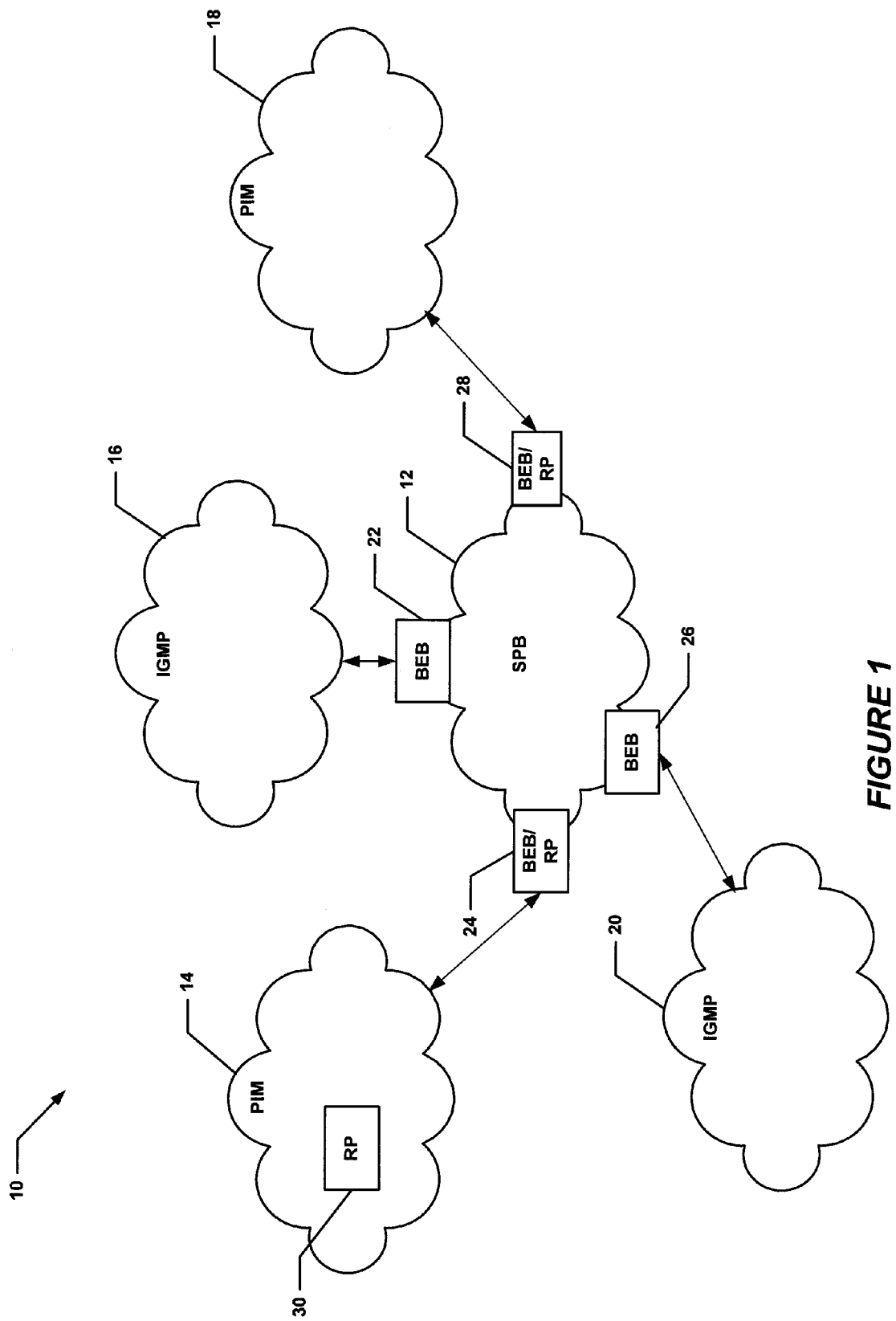
FIG. 1 comprises a block diagram of a system for providing for routing multicast data across multiple multicast routing domains connected by a shortest path bridging network in accordance with embodiments of the invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

An SPB network typically includes a plurality of edge routers referred to as BEBs. For the independent multicast routing domain, the BEB advertises its multicast sender into the SPB network based on policy, by sending Intermediate System to Intermediate System Internet Protocol Multicast Type, Length, Value (ISIS IPMC TLV) data structures with sender information and also an Intermediate System Identifier Address Type, Length, Value (ISID addr TLV) with an ISID allocated for this multicast stream. ISIS IPMC TLVs are flooded in SPB network and all the BEBs receive this IPMC TLV. If any BEB has any interest for this multicast stream, then it sends ISID Addr TLV with receive interest. This way the multicast tree in SPB is created and traffic is forwarded across multiple multicast routing domains. In the PIM-SM Domain, the Rendezvous Point (RP) is the root of a shared tree, wherein all the receivers send join messages to the RP. When the source starts sending multicast data, the first hop router sends the PIM register message to the RP. The RP has the information of all the sources.

In the proposed model, SPB Edge routers (also called BEBs) that are connected to PIM based access networks are configured as RPs. BEBs connected to IGMP only access networks do not need to be configured as RPs. By configuring the BEBs connected to PIM based access networks as RPs, the RPs have knowledge of all the multicast senders and receivers in the corresponding domain. If an RP receives a PIM register message, the RP forms an ISIS IPMC TLV with the multicast sender information, and an Intermediate System to Intermediate System Link State Packet (ISIS LSP) containing the ISIS IPMC TLV is flooded in the SPB Network. The RP allocates an ISID to the multicast stream and sends an ISID Addr TLV with the sender information. All the BEBs receive this ISID ADDR TLV and if any BEB has multicast receive interest, then the BEB responds with ISID Addr TLV with the multicast receive interest information. The multicast receive interest in the BEB is the result of multicast receivers in the domain joined to this group through PIM or IGMP joins. If the BEB receives an ISIS IPMC TLV with the sender information and has no receive interest, then the BEB just stores the information. When the receiver joins, then it looks for sender information in the ISIS IPMC TLV and if the ISIS IPMC TLV with the sender exists, then the BEB sends an ISID ADDR TLV with the receive interest. A multicast tree in the SPB network is created using the ISID ADDR TLVs sent by the BEBs. The advantages of this method are that each access domain may run any multicast routing protocol that need not be supported in the other multicast domains, that this solution scales well with large number of domains, and that this solution allows organic growth of network by adding the new access networks without having to migrate existing access networks.

Figure 2:
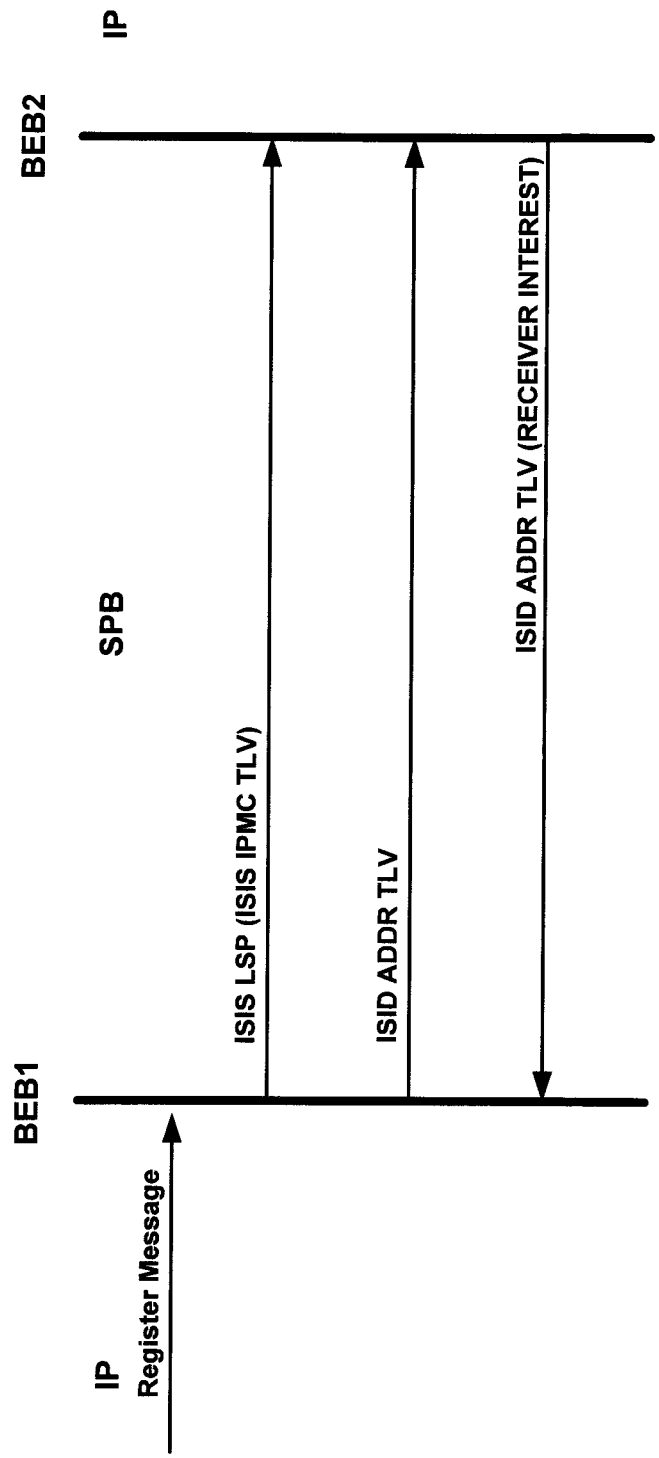
FIG. 2 comprises a ladder diagram showing message flow between devices in accordance with embodiments of the invention.

Referring now to FIGS. 1 and 2, an environment 10 for routing multicast data across multiple multicast routing domains connected by a Shortest Path Bridging (SPB) Network 12 is shown as well as a ladder of diagram of the messages sent and received by an SPB edge router. SPB network 12 includes a plurality of BEB routers 22, 24, 26 and 28 each communicating with a respective network. While SPB network 12 is running the SPB network protocol, the attached networks can run different protocols. In this example network 14 and 18 are running a PIM protocol while networks 16 and 20 are running the Internet Group Management Protocol (IGMP). While PIM and IGMP are shown, it should be appreciated that other network protocols could also be running on the attached networks. In order to permit routing multicast data across multiple multicast routing domains connected by an SPB Network, the following operations take place.

In the SPB network 12, each of the SPB edge routers 24 and 28 connected to a PIM network are configured as a Rendezvous Point (RP). BEB 22 allows SPB network 12 to communicate with IGMP network 16. RP 24 allows SPB network 12 to communicate with PIM network 14. BEB 26 allows SPB network 12 to communicate with IGMP network 20. RP 28 allows SPB network 12 to communicate with PIM network 18.

An example of routing multicast data across multicast routing domains connected by an SPB network will be described. In order to provide multicast data from PIM network 14 to IGMP network 16 a first message is received at RP 24 from RP 30 of PIM network 14. The first message in a particular embodiment comprises a Protocol Independent Multicast (PIM) Register message.

In response to receiving the PIM register message, RP 24 forms a first data structure, the first data structure including multicast sender information. Here, the first data structure comprises an Intermediate System to Intermediate System Internet Protocol Multicast Type, Length, Value (ISIS IPMC TLV) data structure.

RP 24 then floods the SPB network 12 with a second message containing the first data structure. Thus, BEBs 22 and 26 and RP 28 receive the second message. The second message comprises an Intermediate System to Intermediate System Link State Packet (ISIS LSP) message.

RP 24 allocates an identifier (e.g., an ISID) to the multicast stream and sends a second data structure with sender information. This second data structure comprises an identifier that the SPB network uses to construct (Backbone Virtual Local Area Network, Backbone Media Access Controller), also referred to as (BVLAN, BMAC), based multicast state used to forward multicast traffic in the SPB network.

In this example, BEB 22 has receive interest for the multicast stream, so it responds to RP 24 with the second data structure (e.g., an ISID ADDR TLV) with multicast receive interest information. Multicast receive interest in a BEB is the result of multicast receivers in the IGMP network 16 joined to this group. When the BEB 22 joins, BEB 22 looks for sender information in the first data structure and if a first data structure for the sender RP 30 exists, then receiver BEB 22 sends the first data structure with the receive interest. As a result, BEB 22 now has knowledge of RP 30 such that multicast traffic is able to be routed between different networks 14 and 16 connected to the SPB network 12.

Figure 3A:
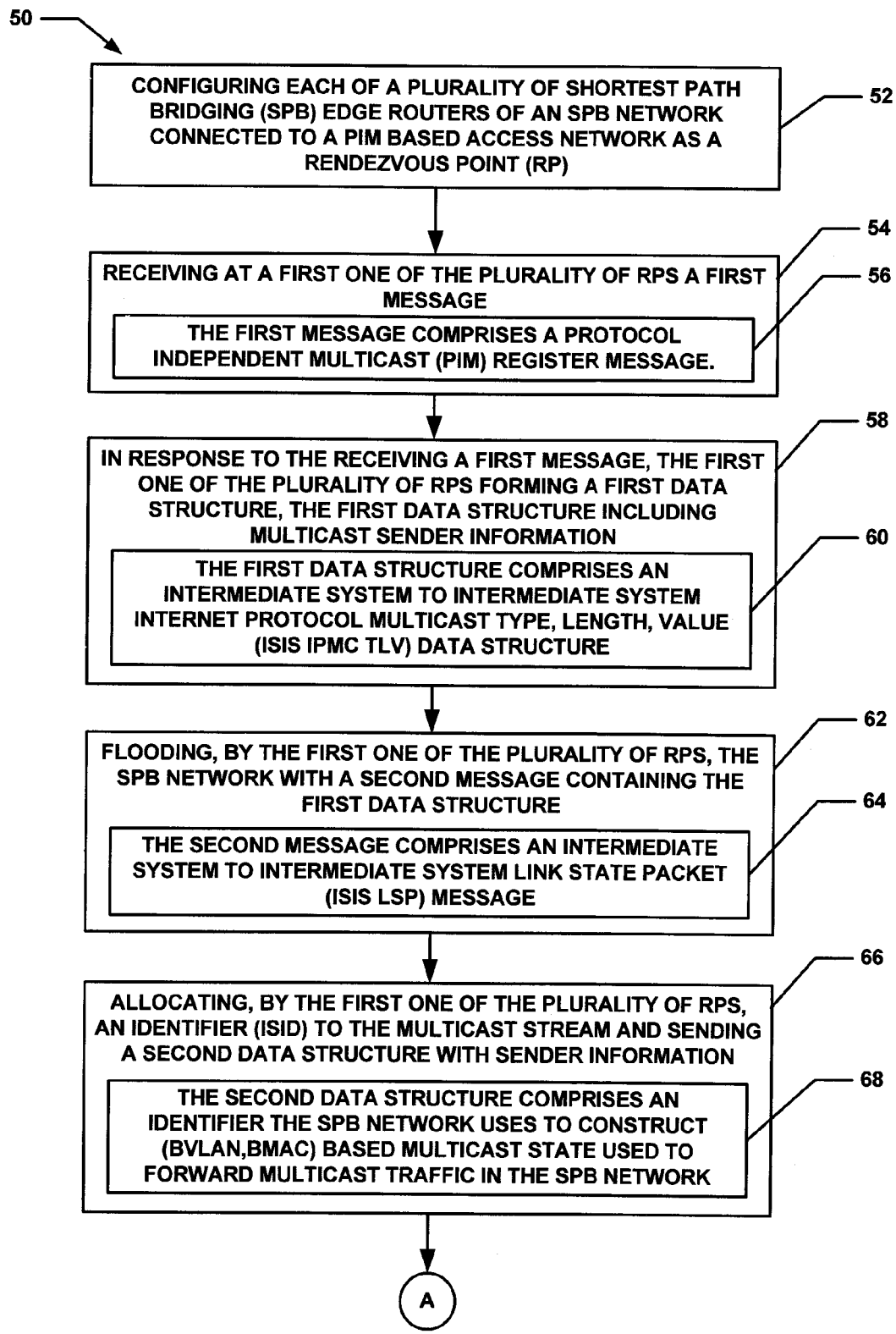
FIG. 3 comprises a flow diagram of a method for providing for routing multicast data across multiple multicast routing domains connected by a shortest path bridging network in accordance with embodiments of the invention.
Figure 3B:
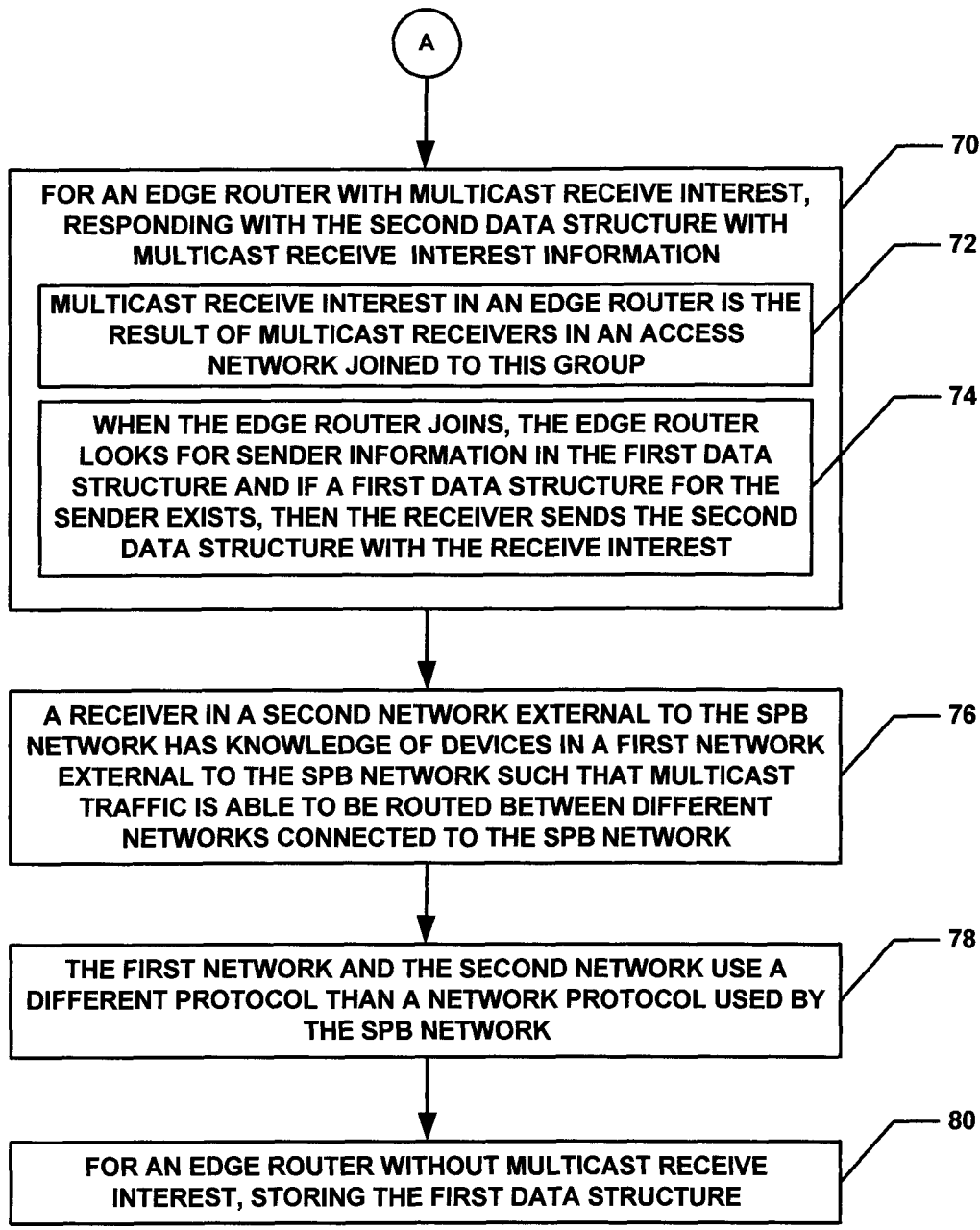

A flow chart of a particular embodiment of the presently disclosed method is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a particular embodiment of a method 50 for routing multicast data across multiple multicast routing domains connected by an SPB Network is shown. Method 50 begins with processing block 52 which discloses configuring each of a plurality of Shortest Path Bridging (SPB) edge routers connected to a PIM network of an SPB network as a Rendezvous Point (RP).

Processing block 54 states receiving at a first one of the plurality of RPs a first message. As shown in processing block 56, in this embodiment the first message comprises a Protocol Independent Multicast (PIM) Register message.

Processing block 58 recites in response to the receiving a first message, the first one of the plurality of RPs forming a first data structure, the first data structure including multicast sender information. As shown in processing block 60, the first data structure comprises an Intermediate System to Intermediate System Internet Protocol Multicast Type, Length, Value (ISIS IPMC TLV) data structure.

Processing block 62 discloses flooding, by the first one of the plurality of RPs, the SPB network with a second message containing the first data structure. As shown in processing block 64, the second message comprises an Intermediate System to Intermediate System Link State Packet (ISIS LSP) message.

Processing block 66 states allocating, by the first one of the plurality of RPs, an intermediate system Identifier (ISID) to the multicast stream and sending a second data structure with sender information. As shown in processing block 68, the second data structure comprises an identifier that the SPB network uses to construct (Backbone Virtual Local Area Network, Backbone Media Access Controller), also referred to as (BVLAN, BMAC), based multicast state used to forward multicast traffic in the SPB network.

Processing continues with processing block 70 which discloses, for an edge router with multicast receive interest, responding with the second data structure with multicast receive interest information. Processing block 72 discloses wherein multicast receive interest in an edge router is the result of multicast receivers in an access network joined to this group. Processing block 74 states when the edge router joins, the edge router looks for sender information in the first data structure and if a first data structure for the sender exists, then the receiver sends the first data structure with the receive interest.

Processing block 76 recites a receiver in a second network external to the SPB network has knowledge of devices in a first network external to the SPB network such that multicast traffic is able to be routed between different networks connected to the SPB network. Processing block 78 discloses the first network and the second network use a different protocol than a network protocol used by the SPB network. Each access domain (the first network and the second network) may run any multicast routing protocol that need not be supported in the other multicast domains. Processing block 80 states for an edge router without multicast receive interest, storing the first data structure.

This presently described method for routing multicast data across multiple multicast routing domains connected by a shortest path bridging network scales well with a large number of domains, and also allows organic growth of network by adding the new access networks without having to migrate existing access networks.

Figure 4:
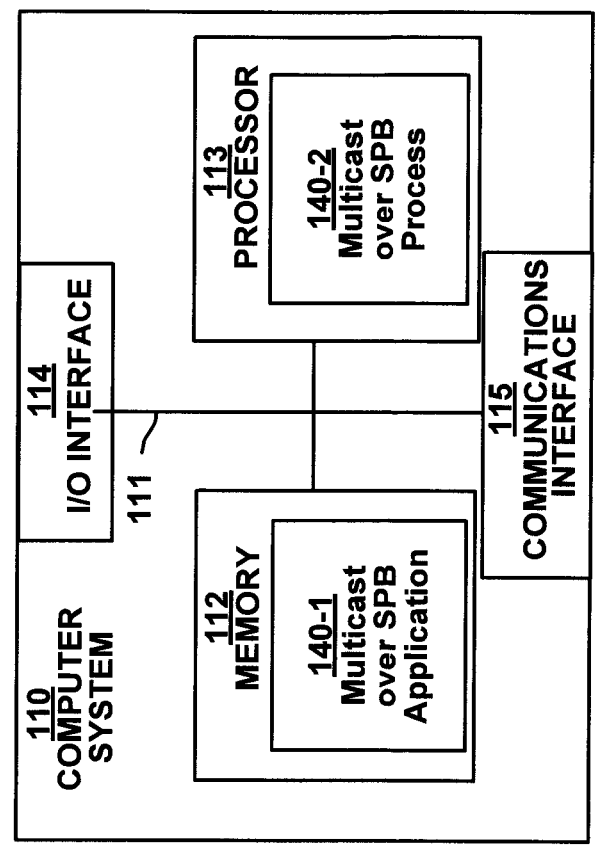
FIG. 4 illustrates an example computer system architecture for a computer system that provides for routing multicast data across multiple multicast routing domains connected by a shortest path bridging network in accordance with embodiments of the invention.

FIG. 4 is a block diagram illustrating example architecture of a computer system 110 that executes, runs, interprets, operates or otherwise performs a multicast over SPB operating application 140-1 and multicast over SPB operating process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the multicast over SPB operating application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a multicast over SPB operating application 140-1 as explained herein. The multicast over SPB operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a multicast over SPB operating application 140-1. Execution of a multicast over SPB operating application 140-1 in this manner produces processing functionality in the multicast over SPB operating process 140-2. In other words, the multicast over SPB operating process 140-2 represents one or more portions or runtime instances of a multicast over SPB operating application 140-1 (or the entire a multicast over SPB operating application 140-1) performing or executing within or upon the processor 113 in the computerized device 110 at runtime.

It is noted that example configurations disclosed herein include the multicast over SPB operating application 140-1 itself (i.e., in the form of un-executed or non-performing logic instructions and/or data). The multicast over SPB operating application 140-1 may be stored on a computer readable medium (such as a floppy disk), hard disk, electronic, magnetic, optical, or other computer readable medium. A multicast over SPB operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a multicast over SPB operating application 140-1 in the processor 113 as the multicast over SPB operating process 140-2. Those skilled in the art will understand that the computer system 110 may include other processes and/or software and hardware components, such as an operating system not shown in this example.

During operation, processor 113 of computer system 100 accesses memory system 112 via the interconnect 111 in order to launch, run, execute, interpret or otherwise perform the logic instructions of the multicast over SPB application 140-1. Execution of multicast over SPB application 140-1 produces processing functionality in multicast over SPB process 140-2. In other words, the multicast over SPB process 140-2 represents one or more portions of the multicast over SPB application 140-1 (or the entire application) performing within or upon the processor 113 in the computer system 100.

It should be noted that, in addition to the multicast over SPB process 140-2, embodiments herein include the multicast over SPB application 140-1 itself (i.e., the un-executed or non-performing logic instructions and/or data). The multicast over SPB application 140-1 can be stored on a computer readable medium such as a floppy disk, hard disk, or optical medium. The multicast over SPB application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of multicast over SPB application 140-1 in processor 113 as the multicast over SPB process 140-2. Those skilled in the art will understand that the computer system 100 can include other processes and/or software and hardware components, such as an operating system that controls allocation and use of hardware resources associated with the computer system 100.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
    configuring each of a plurality of Shortest Path Bridging (SPB) edge routers of an SPB network connected to a Protocol Independent Multicast (PIM) based access network as a Rendezvous Point (RP);
    receiving at a first one of the plurality of RPs a first message;
    in response to the receiving a first message, the first one of the plurality of RPs forming a first data structure, the first data structure including multicast sender information comprising: Intermediate System to Intermediate System Internet Protocol Multicast Type, Length, Value (ISIS IPMC TLV) data structure;
    flooding, by the first one of the plurality of RPs, the SPB network with a second message containing the first data structure;
    allocating, by the first one of the plurality of RPs, an identifier (ISID) to the multicast stream and sending a second data structure with sender information;
    for an edge router with multicast receive interest, responding with the second data structure with multicast receive interest information; and
    wherein a receiver in a second network external to the SPB network has knowledge of devices in a first network external to the SPB network such that multicast traffic is able to be routed between different networks connected to the SPB network.

2. The method of claim 1 wherein the first network and the second network use a different protocol than a network protocol used by the SPB network.

3. The method of claim 1 wherein the first message comprises a Protocol Independent Multicast (PIM) Register message.

4. The method of claim 1 wherein the second message comprises an Intermediate System to Intermediate System Link State Packet (ISIS LSP) message.

5. The method of claim 1 wherein the second data structure comprises an identifier that the SPB network uses to construct (Backbone Virtual Local Area Network, Backbone Media Access Controller (BVLAN, BMAC)) based multicast state used to forward multicast traffic in the SPB network.

6. The method of claim 1 wherein multicast receive interest in an edge router is the result of multicast receivers in an access network joined to this group.

7. The method of claim 1 further comprising, for an edge router without multicast receive interest, storing the first data structure.

8. The method of claim 1 wherein when the edge router joins, the edge router looks for sender information in the first data structure and if a first data structure for the sender exists, then the receiver sends the first data structure with the receive interest.

9. A non-transitory computer readable storage medium having computer readable code thereon for routing multicast data across multiple routing domains connected by a Shortest Path Bridging (SPB) bridge, the medium including instructions in which a computer system performs operations comprising:
  configuring each of a plurality of Shortest Path Bridging (SPB) edge routers of an SPB network connected to a Protocol Independent Multicast (PIM) based access network as a Rendezvous Point (RP);
  receiving at a first one of the plurality of RPs a first message;
  in response to the receiving a first message, the first one of the plurality of RPs forming a first data structure, the first data structure including multicast sender information comprising: Intermediate System to Intermediate System Internet Protocol Multicast Type, Length, Value (ISIS IPMC TLV) data structure;
  30 flooding, by the first one of the plurality of RPs, the SPB network with a second message containing the first data structure;
  allocating, by the first one of the plurality of RPs, an identifier (ISID) to the multicast stream and sending a second data structure with sender information;
  for an edge router with multicast receive interest, responding with the second data structure with multicast receive interest information; and
  wherein a receiver in a second network external to the SPB network has knowledge of devices in a first network external to the SPB network such that multicast traffic is able to be routed between different networks connected to the SPB network.

10. The computer readable storage medium of claim 9 further comprising instructions wherein the first network and the second network use a different protocol than a network protocol used by the SPB network.

11. The computer readable storage medium of claim 9 further comprising instructions wherein the first message comprises a Protocol Independent Multicast (PIM) Register message.

12. The computer readable storage medium of claim 9 further comprising instructions wherein the second message comprises an Intermediate System to Intermediate System Link State Packet (ISIS LSP) message.

13. The computer readable storage medium of claim 9 further comprising instructions wherein the second data structure comprises an identifier that the SPB network uses to construct (Backbone Virtual Local Area Network, Backbone Media Access Controller (BVLAN, BMAC)) based multicast state used to forward multicast 30 traffic in the SPB network.

14. The computer readable storage medium of claim 9 further comprising instructions wherein multicast receive interest in an edge router is the result of multicast receivers in an access network joined to this group.

15. The computer readable storage medium of claim 9 further comprising for an edge router without multicast receive interest, instructions for storing the first data structure.

16. The computer readable storage medium of claim 9 further comprising instructions wherein when the edge router joins, the edge router looks for sender information in the first data structure and if a first data structure for the sender exists, then the receiver sends the first data structure with the receive interest.

17. A computer system comprising:
  a memory;
  a processor;
  a communications interface;
  an interconnection mechanism coupling the memory, the processor and the communications interface; and
  wherein the memory is encoded with an application for routing multicast data across multiple routing domains connected by an Shortest Path Bridging (SPB) bridge, that when performed on the processor, provides a process for processing information, the process causing the computer system to perform the operations of:
  configuring each of a plurality of Shortest Path Bridging (SPB) edge routers of an SPB network connected to a Protocol Independent Multicast (PIM) based access network as a Rendezvous Point (RP);
  receiving at a first one of the plurality of RPs a first message;
  in response to the receiving a first message, the first one of the plurality of RPs forming a first data structure, the first data structure including multicast sender information comprising: Intermediate System to Intermediate System Internet Protocol Multicast Type, Length, Value (ISIS IPMC TLV) data structure;
  flooding, by the first one of the plurality of RPs, the SPB network with a second message containing the first data structure;
  allocating, by the first one of the plurality of RPs, an identifier (ISID) to the multicast stream and sending a second data structure with sender information;
  for an edge router with multicast receive interest, responding with the second data structure with multicast receive interest information; and
  wherein a receiver in a second network external to the SPB network has knowledge of devices in a first network external to the SPB network such that multicast traffic is able to be routed between different networks connected to the SPB network.

18. The computer system of claim 17 wherein the first message comprises a Protocol Independent Multicast (PIM) Register message, wherein the first data structure comprises an Intermediate System to Intermediate System Internet Protocol Multicast Type, Length, Value (ISIS IPMC TLV) data structure, wherein the second message comprises an Intermediate System to Intermediate System Link State Packet (ISIS LSP) message, and
  wherein the second data structure comprises an identifier that the SPB network uses to construct (Backbone Virtual Local Area Network, Backbone Media Access Controller (BVLAN, BMAC)) based multicast state used to forward multicast traffic in the SPB network.

* * * * *